United States Patent [19]
Sommer

[11] 4,107,985
[45] Aug. 22, 1978

[54] LOAD CELL

[75] Inventor: Thomas R. Sommer, Sebastopol, Calif.

[73] Assignee: National Controls, Inc., Santa Rosa, Calif.

[21] Appl. No.: 721,981

[22] Filed: Sep. 10, 1976

[51] Int. Cl.² .................. G01L 1/22; G01G 3/14; G01G 3/08
[52] U.S. Cl. .................. 73/141 A; 177/211; 177/229
[58] Field of Search .............. 177/211, 229; 73/141 A

[56] References Cited

U.S. PATENT DOCUMENTS

| | | | |
|---|---|---|---|
| 3,780,817 | 12/1973 | Videon | 177/211 X |
| 3,788,411 | 1/1974 | Oxley | 177/211 |
| 3,805,604 | 4/1974 | Ormond | 73/141 A |
| 3,837,416 | 9/1974 | Nozaki | 177/211 X |
| 3,927,560 | 12/1975 | Farr | 73/141 A |
| 3,938,603 | 2/1976 | Shoberg et al. | 177/211 |
| 3,980,147 | 9/1976 | van der Schoot | 177/229 X |
| 3,994,161 | 11/1976 | Trozera | 177/211 X |
| 4,020,911 | 5/1977 | English et al. | 177/211 X |

Primary Examiner—George H. Miller, Jr.
Attorney, Agent, or Firm—Flehr, Hohbach, Test, Albritton & Herbert

[57] ABSTRACT

Force transducing load cell having a load arm, a load bearing beam rigidly connected to the load arm for bending in response to a load applied to the arm, strain sensing elements mounted on the beam for providing an output signal corresponding to a load, and restraining arms which permit axial movement of the load arm and direct extraneous forces produced by off-center or non-axial loading away from the beam. The beam is bent in a double curved, S-shaped manner with separate regions of tensive and compressive stress on one surface, and the sensing elements are mounted in these regions to effect cancellation of any extraneous stresses produced in the beam by off-center loading.

2 Claims, 3 Drawing Figures

LOAD CELL

BACKGROUND OF THE INVENTION

This invention pertains generally to force transducers and more particularly to a load cell in which the magnitude of a force, such as the weight of a load, is determined from the stress produced in a bending beam to which the load is applied.

Bending beam force transducers have been used widely in stress analysis and electronic weighing applications. One such device is described in U.S. Pat. No. 3,951,221, issued Apr. 20, 1976 to the assignee herein.

Load cells of this type have been found to give very accurate results as long as the load is applied axially, that is parallel to and concentric with the principal axis of the transducer. Loads applied away from the axis tend to produce extraneous bending moments and stresses which result in inaccurate readings. In many applications, the platform or the load receiving member must be isolated from the load cell by pivots and bearings, flexures or other suitable means, with a flexible connection to the load cell to insure true axial loading.

SUMMARY AND OBJECTS OF THE INVENTION

The invention provides a bending beam load cell which is essentially insensitive to and unaffected by off-center loading. The load cell includes a load cell, a load bearing beam rigidly connected to the load arm for bending in response to the load applied to the load arm, strain sensing elements mounted on the beam for providing an output signal corresponding to the load, and restraining arms which permit axial movement of the load arm and direct extraneous forces produced by off-center or non-axial loading away from the beam. The beam is bent in a double curved, S-shaped manner with separate regions of tensive and compressive stress on one surface, and the sensing elements are mounted in these regions to effect cancellation of any extraneous stresses produced in the beam by off-centering loading.

It is in general an object of the invention to provide a new and improved load cell of the bending beam type.

Another object of the invention is to provide a load cell of the above character which is substantially insensitive to and unaffected by off-center loading.

Additional objects and features of the invention will be apparent from the following description in which the preferred embodiments are set forth in detail in conjunction with the accompanying drawings.

DESCRIPTION OF THE PREFERRED EMBODIMENTS

Figure 1:
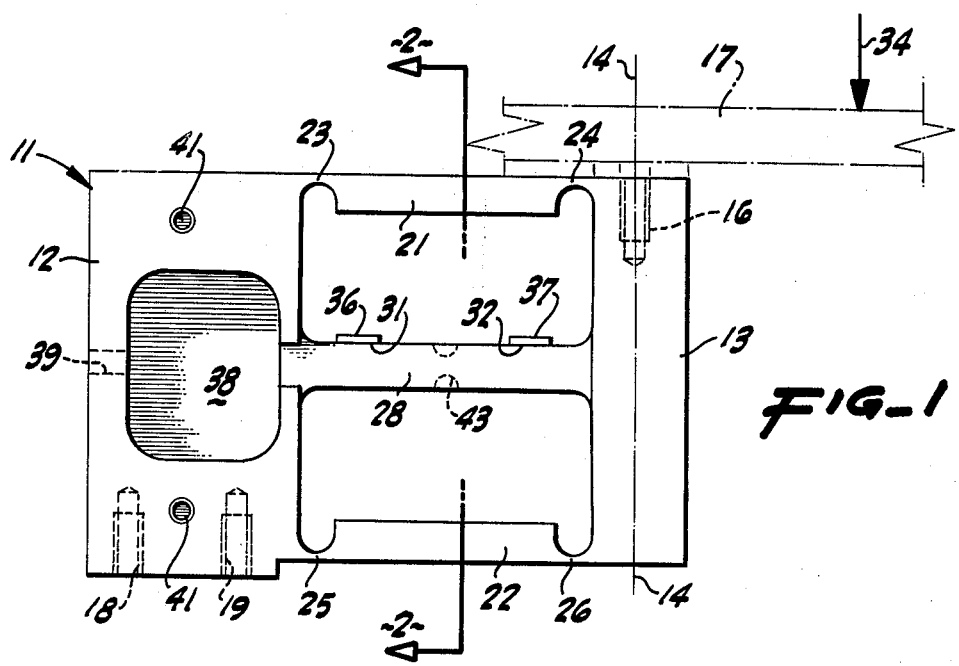
FIG. 1 is a side elevational view of one embodiment of a load cell incorporating the invention.
Figure 2:
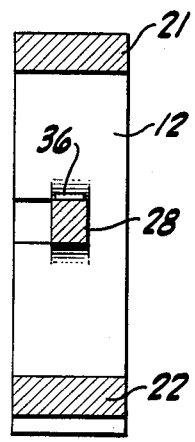
FIG. 2 is a cross-sectional view taken along line 2—2 of FIG. 1.

As illustrated in FIGS. 1 and 2, the load cell comprises a generally rectangular body 11 which includes an upright base 12 and a load arm 13. The load arm is spaced from the base and has a vertically extending axis 14 which is at times referred to as the load axis or the principal axis of the load cell. An axially extending threaded hole 16 is formed in the upper portion of the load arm for receiving the mounting screw of a horizontally extending platform 17 or other load receiving member, as illustrated in phantom lines in FIG. 1. Threaded mounting holes 18, 19 are formed in the lower portion of the base for receiving mounting screws, not shown, whereby the load cell can be affixed to a suitable mounting surface.

Body 11 also includes a pair of horizontally extending restraining arms 21, 22 which interconnect the load arm and base through flexures 23-26. As illustrated, the restraining arms are of substantially equal length, and they constrain the load arm for swinging movement in a vertical direction generally parallel to axis 14. In this embodiment, the lower surface of arm 22 is offset above the lower surface of the base to provide clearance for movement of the load arm above the mounting surface, the amount of offset being chosen to limit the movement to protect the load cell from damage due to overloads.

A substantially rigid beam 28 extends between and is affixed at its ends to base 12 and load arm 13 for bending in response to a load applied to the load arm. Without restraining arms 21, 22 the beam would bend in the manner of a conventional cantilevered beam, with the end toward the load arm being deflected downwardly by the load. However, with the restraining arms the beam bends in a double curved, S-shaped manner with an upward bow toward the base and a downward bow toward the load arm. At the upper surface of the beam, this bending produces a region of tensive stress toward the base and a region of compressive stress toward the load arm. On the lower surface of the beam, regions of tensive and compressive stress are formed toward the load arm and base, respectively.

The distribution between restraining arms 21, 22 and beam 28 of the stress produced by an axially applied load is dependent upon the relative flexabilities of flexures 23-26 and beam 28. Since the accuracy and sensitivity of the load cell are optimized when the axial component of the load is born by beam 28, rather than by the restraining arms, the beam is preferably made substantially more rigid than the flexures. In the preferred embodiments, the flexures and beam are fabricated of the same material and greater rigidity is provided by making the beam thicker than the flexures.

While it is desirable to concentrate the stress produced by axial loads in beam 28, at the same time, it is desirable to minimize the effect of non-axial loads on the beam. Toward this end, flexures 23-26 are made more rigid than the beam with respect to loads applied away from axis 14 to the sides of the load cell, that is in front of or behind the plane of FIG. 1. Consequently, the bending moment due to the non-axial application of such forces is transmitted to the restraining arms, rather than the beam. With loads applied away from the axis in the plane of the load cell, as indicated by arrow 34 in FIG. 1, the longitudinal rigidity of the restraining arms and flexures tends to prevent the bending moment due to the non-axial loading from being applied to the beam.

Means is provided for sensing the stress produced in beam 28 and providing an output signal indicative of the applied load. This means includes strain gauge 36, 37 mounted in regions 31, 32 on the upper surface of the beam. These elements can be of suitable known design, such as resistive or semiconductor strain gauges. In the preferred embodiment, the strain gauges are resistive devices connected in a conventional bridge circuit. Electrical connections to the strain gauges are made by leads (not shown) trained along beam 28. A cavity 38 is formed in one side of base 12, and the strain gauge leads are connected to a cable, (not shown) in the cavity for connection to the outside world. The cable passes out of cavity 38 through an opening 39 formed in the end of the base, and a moisture resistant protective coating is placed over the strain gauges and leads and in the cavity.

The body of the load cell is fabricated of a material having a high modulus of elasticity, such as an aluminum alloy. In the preferred embodiment, the body is formed as a unitary structure from a solid block of the material by a suitable process such as milling. The sides of the load cell are covered by generally planar side plates (not shown) which are secured to the body by mounting screws received in holes 41 in base 12.

Operation and use of the load cell can now be described. It is assumed that base 12 has been secured to a suitable mounting surface and that a load recieving member, such as the platform of the scale, has been mounted on load arm 13. A load applied to the platform will cause the load arm to move downwardly, thereby bending beam 28 and producing stresses which are sensed by strain gauges 36, 37. As discussed above, the beam bends in a double curved, S-shaped manner to produce tensive and compressive stresses, respectively, in regions 31, 32.

With an axially applied load, that is a load applied concentrically to axis 14, the flexability of flexures 23-26 causes substantially the entire load to be transmitted to beam 28. With loads displaced from the axis to the sides to the load cell, the flexures are substantially rigid, and the spurious being moments produced by such loads are transmitted to the restraining arms rather than the beam. With loads displaced from the axis in the plane of the load cell, the longitudinal rigidity of the restraining arms and flexures causes the extraneous bending moments to be applied primarily to the restraining arms. To the extent that such loads may produce extraneous stresses in the beam, the effects of such stresses are cancelled by the location of the strain gauges in regions of tensive stress and compressive stress on the same surface of the beam.

With the restraining arms and beam arranged in the manner illustrated, a zero bending moment is produced at the center of the beam for both axial and non-axial loads. This makes it possible to reduce the thickness of the beam at the center, as illustrated by dashed lines 43 in FIG. 1. This reduction in thickness has been found to further reduce the effect of non-axial load forces on the beam and to cause an even greater portion of such forces to be transmitted to the restraining arms.

Figure 3:
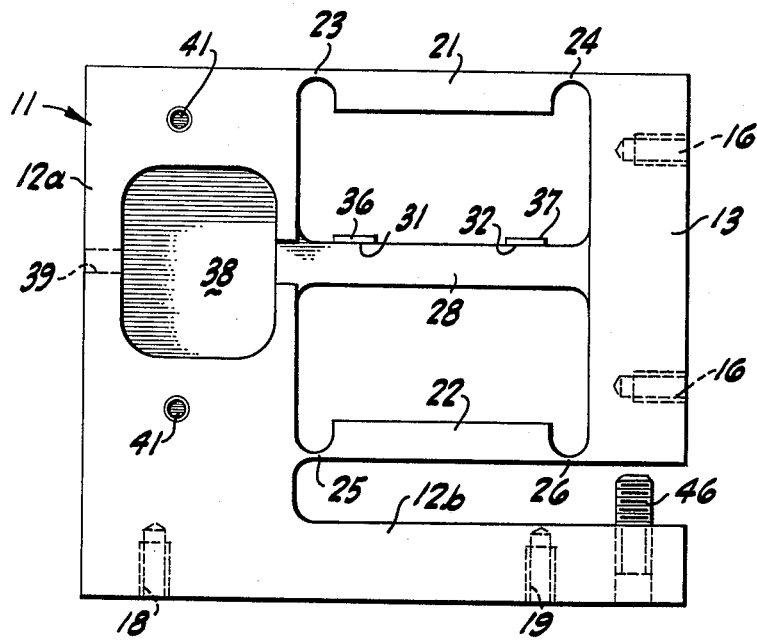
FIG. 3 is a side elevational view of another embodiment of a load cell incorporating the invention.

The load cell shown in FIG. 3 is generally similar to the embodiment of FIGS. 1 and 2, and like reference numerals are used to designate corresponding elements. In the embodiment of FIG. 3, the base includes an upright portion 12a and a lower portion 12b which extends horizontally below the restraining arms and load arm. An adjustable stop screw 46 is mounted in the lower portion of the base in axial alignment with the load arm for limiting the movement of that arm. In addition, a pair of mounting holes are provided at the outer edge of the load arm for receiving the mounting screws for a platform or other load receiving member. Operation and use of the embodiment of FIG. 3 is similar to that described above.

The invention has a number of important features and advantages. The load cell is capable of very accurate readings and is substantially insensitive to off-axis loading. The load cell is particularly suitable for use in scales since a platform or other load receiving member can be mounted directly on the load arm. Weight readings are substantially uniform regardless of where the load is placed on the platform. The load cell is economical to manufacture and is suitable for production in large quantities.

It is apparent from the foregoing that a new and improved load cell has been provided. While only the presently preferred embodiments have been described, as will be apparent to those familiar with the art, certain changes and modifications can be made without departing from the scope of the invention as defined by the following claims.

What is claimed is:

1. In a load cell: a base, a load arm spaced from the base for receiving a load applied in an axial direction, a pair of generally parallel arms with flexures interconnecting the base and load arm and constraining the load arm for movement in the axial direction, a substantially rigid beam affixed to the load arm and base and having a region of reduced thickness toward the center thereof, and stress responsive means mounted on the beam and spaced longitudinally apart between the region of reduced thickness and the ends of the beam for providing an output signal corresponding to the load.

2. The load cell of claim 1 wherein the stress responsive means comprises first and second strain gauges mounted on one surface of the beam toward opposite ends thereof.

* * * * *